(No Model.)
J. L. WILLFORD.
LUBRICATOR.
No. 360,749. Patented Apr. 5, 1887.
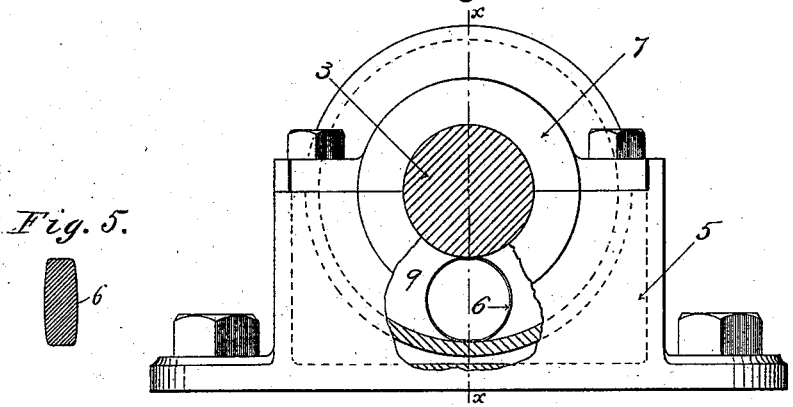
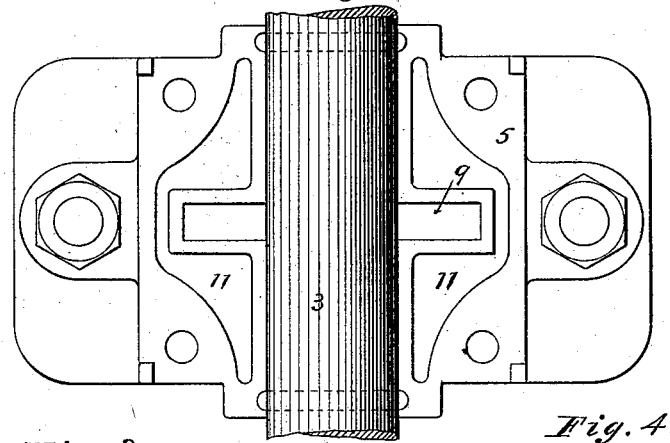
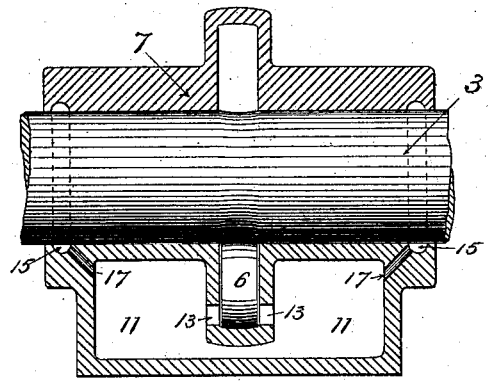
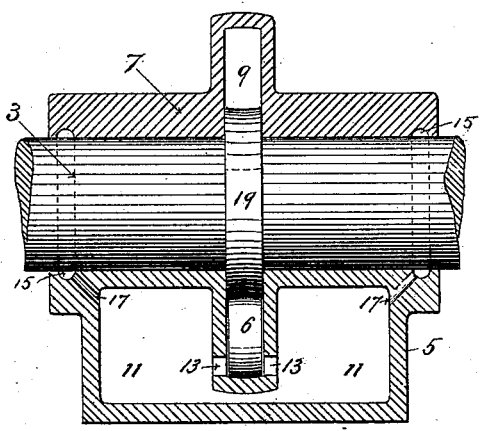
Witnesses
Inventor
Joseph L. Willford

UNITED STATES PATENT OFFICE.

JOSEPH L. WILLFORD, OF MINNEAPOLIS, MINNESOTA.

LUBRICATOR.

SPECIFICATION forming part of Letters Patent No. 360,749, dated April 5, 1887.

Application filed June 15, 1886. Serial No. 205,210. (No model.)

*To all whom it may concern:*

Be it known that I, JOSEPH L. WILLFORD, of Minneapolis, in the county of Hennepin and State of Minnesota, have invented certain Improvements in Lubricators, of which the following is a specification.

This invention relates to improvements in devices designed for lubricating shafts, journals, rolls, axles, loose pulleys, and other bearings wherein it is desirable to provide means to reduce the friction by a supply of lubricating material to the contact surfaces.

The object I have in view is to provide a lubricating device that is adapted for general application, that is simple and durable in construction, and that will constantly supply the lubricant to the bearing-surfaces as long as one of them is in motion.

My invention consists, generally, in a lubricator having a loose disk, button, or ring that travels in an annular recess or chamber around a shaft, axle, arbor, or journal, and forces the lubricating material from the lower part of the recess or chamber up and over the bearing-surfaces.

The invention also consists in the construction and combination hereinafter described, and particularly pointed out in the claims.

In the accompanying drawings, forming part of this specification, Figure 1 is an end elevation, partially broken away, of a journal-box and journal having my invention applied thereto. Fig. 2 is a plan of the same with the cap or upper half-box removed. Fig. 3 is a vertical longitudinal section on line X X, Fig. 1. Fig. 4 is a view similiar to Fig. 3, but showing a slightly modified construction of journal. Figs. 5, 6 are details.

In the drawings, 3 represents a journal, shaft, or axle, which may be any ordinary or preferred construction. I have shown this journal mounted in a journal-box consisting of a lower half-box, 5, and cap 7, secured thereto by screws or other suitable means.

The journal-box herein shown is of a common form, and I do not wish to be understood as confining myself thereto, as the invention may be applied as well to any other suitable form of journal box or bearing.

In the journal-box is an annular recess, groove, or chamber, 9, that extends entirely around the shaft or journal, as indicated by the dotted lines in Fig. 1. In this groove I place a disk, button, or ring, 6, which is preferably formed of an elastic or semi-elastic material, such as rubber, cork, or leather. The diameter of the disk or ring is slightly greater than the distance between the bottom of the groove and the surface of the journal. The disk or ring is thereby slightly compressed, so that the friction between its surface and the surface of the shaft is sufficient to cause it to be rolled along in the groove as the shaft is rotated and to travel around the shaft in the groove or chamber 9. The oil for lubricating the bearing is supplied to the lower part of the groove 9, preferably by being placed in a suitable well or receptacle, as 11, communicating with the groove 9 by suitable openings, as 13. This device that travels in the groove and conveys the oil up around the shaft, axle, or journal I designate as a "follower."

I prefer to provide the journal-box with suitable grooves, 15, arranged near its ends and communicating with the oil-well through openings 17, for the purpose of catching the surplus oil that oozes through between the journal and the bearing-surface of the box, and returning it to the oil-receptacle. I also prefer to have the oil-well open to the upper surface of the lower half-box, as shown in Fig. 2, so that any oil that drifts into the packing in the joint between the lower half-box and the cap will pass through this opening into the oil-receptacle instead of working through to the outside of the box.

The operation of the device is as follows: The receptacle being supplied with oil, a portion of it passes into the lower part of the groove or chamber 9. As the shaft rotates, the disk or ring 6 travels around the shaft in the chamber 9, and each time it passes through the lower part of the chamber it forces a portion of the oil along in front of it and carries it up and around the shaft. During its passage along the chamber 9 the oil oozes between the shaft and the bearing-surfaces of the box, and thereby their surfaces are constantly lubricated. The surplus oil returns to the oil-well, and the operation continues while the shaft is in motion. The thickness of the disk will, preferably be a little less than the width of the groove. The width of the groove and the thickness of the disk may be varied, as required by the amount of oil necessary to properly lubricate the bearing.

By using disks of different thickness, the supply of oil may be regulated. In some instances I prefer to use a light steel ring, 6, as shown in Fig. 1. This ring has the advantage of not being liable to set and retain the shape into which it is forced by the pressure upon it when the shaft remains stationary for some time. I find that a disk of cork, rubber, or leather, Fig. 5, or a gasket of such material, Fig. 6, or a leather gasket having a metal spring within it, may be used with excellent results.

I do not confine myself to any particular material for the disk 6, or to any particular shape therefor, as the same may be varied without departing from my invention, and I wish to be understood as claiming, broadly, the form here shown and described, or its equivalent, for the purpose of moving the oil in the groove 9. In some instances the journal or arbor may be provided with a collar, 19, Fig. 4, that projects into the groove 9. In this case the ring will bear against the edge of the collar. This construction is especially adapted for the rolls of roller grinding-mills in which a collar on the journal is required to keep the roll from moving lengthwise in its bearings.

In some instances the journal may have a concave groove in its surface and the bottom of the groove 9 may be of similar form. In this instance the edge of the ring will preferably be made convex, to adapt it to the groove in the shaft. With this construction the ring will be guided in its travel by this groove.

The lubricator may also be applied to loose pulleys running upon a stationary shaft without departing from my invention. In this case the groove 9 will be in the moving part of the bearing, instead of in the stationary part.

I claim as my invention—

1. A shaft, journal, or axle box having an annular groove in its inner surface, in combination with an elastic follower traveling around in said groove and conveying the lubricant from the lower to the upper part thereof, for the purpose specified.

2. A lubricator consisting of a journal-box having an annular groove on its inner surface and a circular follower traveling in said groove, substantially as described.

3. The combination, with the shaft or journal, of the journal-box having the annular groove 9, and the circular follower in said groove, for the purpose set forth.

4. The combination, with a shaft or journal, as 3, of the journal-box having an annular groove or recess, an oil well or receptacle communicating with said groove, and a circular follower, 6, arranged in said groove, for the purpose set forth.

5. The combination, with a journal or axle, as 3, of a journal-box, as 5 7, having an annular groove therein, and an oil-receptacle communicating with said groove and having the grooves 15 and openings 17, and the circular follower 6, all substantially as described, and for the purpose set forth.

6. The combination, with a shaft or journal, of the journal-box consisting of the half-box 5 and cap 7, having the annular groove 9, the circular follower 6, arranged therein, and the oil-receptacle 11, communicating with said groove and opening to the top of the lower half-box, for the purpose set forth.

In testimony whereof I have hereunto set my hand this 28th day of May, 1886.

JOSEPH L. WILLFORD.

In presence of—
A. C. PAUL,
R. H. SANFORD.